(12) United States Patent
Stockinger

(10) Patent No.: US 6,472,489 B1
(45) Date of Patent: Oct. 29, 2002

(54) POLYMERS

(75) Inventor: Friedrich Stockinger, Courtepin (CH)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 09/442,397

(22) Filed: Nov. 18, 1999

(30) Foreign Application Priority Data

Nov. 20, 1998 (EP) ............................................ 98122012

(51) Int. Cl.$^7$ ................................................. C08F 26/00
(52) U.S. Cl. ...................... 526/312; 526/302; 526/317.1
(58) Field of Search ................................ 526/312, 302, 526/317.1

(56) References Cited

U.S. PATENT DOCUMENTS

| | | | | |
|---|---|---|---|---|
| 4,670,517 A | * | 6/1987 | Shimizu et al. | 525/328.2 |
| 4,701,497 A | * | 10/1987 | Serizawa et al. | 525/292 |
| 5,527,925 A | | 6/1996 | Chabrecek et al. | 549/430 |

FOREIGN PATENT DOCUMENTS

| | | | |
|---|---|---|---|
| EP | 0 142 962 A2 | | 5/1985 |
| EP | 0 154 742 A2 | | 9/1985 |
| EP | 0 201 192 A2 | | 12/1986 |
| EP | 207 495 A2 | | 1/1987 |
| EP | 0 207 495 A2 | * | 1/1987 |
| EP | 0 768 321 A2 | | 4/1997 |
| EP | 0 791 605 A2 | | 8/1997 |
| EP | 0791 605 A2 | * | 8/1997 |

* cited by examiner

*Primary Examiner*—David W. Wu
*Assistant Examiner*—William K Cheung
(74) *Attorney, Agent, or Firm*—R. Scott Meece; Jian S. Zhou; Richard I. Gearhart

(57) ABSTRACT

The invention relates to novel polyallyl amine polymers having a weight average molecular weight of at least 2000 that, based on the number of amino groups of the polyallyl amine, comprises from approximately 1 to 99% of units of formula

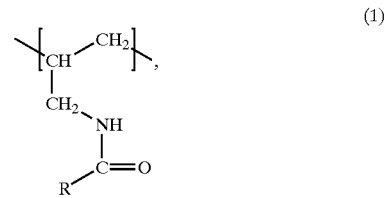

(1)

wherein R is as defined in the claims. The novel polyallyl amine polymers are useful, for example, for the surface-modification of different substrates or may be used for the manufacture of biomedical mouldings.

10 Claims, No Drawings

POLYMERS

The present invention relates to novel polyallyl amine based polymers, a process for their manufacture and their use for the preparation of mouldings, in particular ophthalmic mouldings, or surface coatings.

The polymers of the invention are preferably a derivative of a polyallyl amine having a weight average molecular weight of at least 2000 that, based on the number of amino groups of the polyallyl amine, comprises from approximately 1 to 99% of units of formula

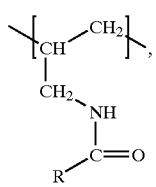
(1)

wherein R is $C_2$–$C_6$-alkyl which is substituted by two or more same or different substituents selected from the group consisting of hydroxy, $C_2$–$C_5$-alkanoyloxy and $C_2$–$C_5$-alkylamino-carbonyloxy.

R is preferably linear $C_3$–$C_6$-alkyl, more preferably linear $C_4$–$C_5$-alkyl, and most preferably n-pentyl which is in each case substituted as defined above.

Suitable substituents of the alkyl radical R are —OH, a radical —O—C(O)—$R_1$ and/or a radical —O—C(O)—NH—$R_1'$ wherein $R_1$ and $R_1'$ are each independently of the other $C_1$–$C_4$-alkyl, preferably methyl, ethyl or n- or iso-propyl, and more preferably methyl or ethyl.

Preferred substituents of the alkyl radical R are hydroxy, acetyloxy, propionyloxy, n- or iso-butanoyloxy, methylaminocarbonyloxy or ethylaminocarbonyloxy, especially hydroxy, acetyloxy or propionyloxy and in particular hydroxy.

A preferred embodiment of the invention relates to polyallyl amines comprising units of the above formula (1), wherein R is a radical of formula

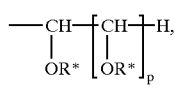
(2)

wherein p is 1, 2, 3, 4 or 5, preferably 3 or 4 and in particular 4, each R* is independently hydrogen or a radical —C(O)—$R_1$ or —C(O)—NH—$R_1'$, and for $R_1$ and $R_1'$ the above meanings and preferences apply. R is even more preferred a radical of the above formula (2) wherein p is 3 or 4, in particular 4, and each group —OR* independently is hydroxy or hydroxy which is partly or completely acetylated, in particular hydroxy. Particular preferred radicals R are 1,2,3,4,5-pentahydroxy-n-pentyl or 1,2,3,4,5-pentahydroxy-n-pentyl wherein the hydroxy groups are partly or completely acetylated.

The polymers of the invention are derivatives of a polyallyl amine that, based on the number of amino groups of the polyallyl amine, comprise from about 1 to 99%, preferably from 10 to 80%, more preferably, from 15 to 75%, even more preferably 20 to 70% and in particular 40 to 60%, of units of formula (1). The polymers of the invention are advantageously water-soluble.

The term units of formula (1) or of another formula number below is always to be understood as encompassing one or more different species falling under the respective formula; preferably the term means one single species.

In addition to the units of formula (1), the novel polyallyl amines may comprise further modifier units. Of the many possibilities for such modifiers, the following may be mentioned by way of example:

(i)

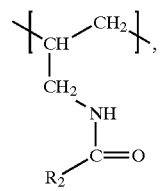
(2a)

wherein $R_2$ is $C_1$–$C_{12}$-alkyl which is unsubstituted or substituted by an amino, hydroxy or carboxy group;

(ii)

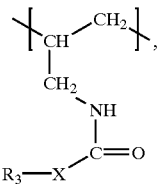
(2b)

wherein X is —O— or —NH— and $R_3$ is $C_1$–$C_{12}$-alkyl;

(ii)

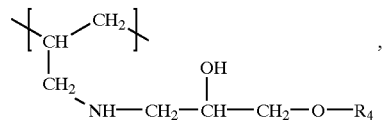
(2c)

wherein $R_4$ is hydrogen, $C_1$–$C_6$-alkyl which is unsubstituted or substituted by hydroxy, or is $C_5$–$C_7$-cycloalkyl or phenyl;

(iv)

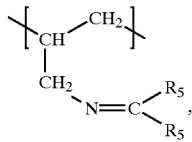
(2d)

wherein $R_5$ is $C_1$–$C_{12}$-alkyl and $R_5'$ is hydrogen or $C_1$–$C_{12}$-alkyl; or (v)

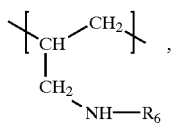
(2e)

wherein $R_6$ is a radical comprising an ethylenically unsaturated group, for example a $C_3$–$C_{12}$-alkenyl radical which may be further substituted by hydroxy, or a radical of formula

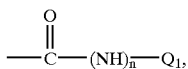

(3)

wherein $Q_1$ is, for example, a radical of formula

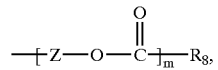

(4a)

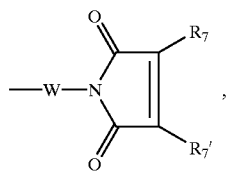

(4b)

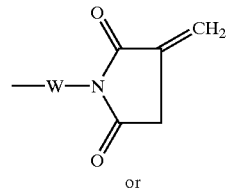

(4c)

or

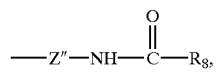

(4d)

and wherein

Z is linear or branched $C_2$–$C_{12}$alkylene, $R_8$ is an olefinically unsaturated copolymerisable radical having from 2 to 24 carbon atoms which may be further substituted, W is a $C_2$–$C_{12}$alkylene radical, phenylene radical or $C_7$–$C_{12}$aralkylene radical, each of $R_7$ and $R_7'$ independently of the other is hydrogen, $C_1$–$C_4$alkyl or halogen, each of m and n independently of the other is the number 0 or 1, and Z" is $C_1$–$C_6$alkylene.

In the above formulae, the following meanings and preferences apply:

$R_2$ is preferably $C_1$–$C_6$-alkyl, especially $C_1$–$C_4$-alkyl and even more preferably $C_1$–$C_3$-alkyl which may be substituted in each case as mentioned above. Preferred substituents of the alkyl radical $R_2$ are a hydroxy or carboxy group, in particular a hydroxy group.

Preferred meanings of $R_2$ are (i) $C_1$–$C_3$-alkyl, in particular methyl or ethyl; (ii) hydroxy-$C_2$–$C_5$-alkyl, especially hydroxy-$C_2$–$C_3$-alkyl and in particular β-hydroxyethyl, β-hydroxypropyl or γ-hydroxypropyl; or (iii) carboxy-$C_1$–$C_6$-alkyl, especially carboxy-$C_2$–$C_4$-alkyl and in particular —(CH$_2$)$_{2-3}$-COOH.

X is —O— or preferably —NH—. $R_3$ is preferably $C_1$–$C_6$-alkyl, more preferably $C_1$–$C_3$-alkyl and in particular methyl, ethyl or n- or isopropyl.

$R_4$ is preferably hydrogen, hydroxy-substituted $C_2$–$C_4$-alkyl or cyclohexyl, and in particular hydrogen, 2-hydroxyethyl or 2-hydroxypropyl.

$R_5$ is preferably $C_1$–$C_6$-alkyl, more preferably $C_1$–$C_3$-alkyl and in particular methyl or ethyl. $R_5'$ is preferably hydrogen or $C_1$–$C_3$-alkyl, in particular hydrogen.

$R_6$ as an alkenyl radical is preferably a $C_3$–$C_6$-alkenyl radical which is optionally substituted by hydroxy and more preferably hydroxy-substituted $C_3$–$C_5$-alkenyl. Examples of preferred alkenyl radicals $R_6$ are allyl or in particular the radical —CH$_2$—CH(OH)—CH$_2$—CH=CH$_2$.

Z is preferably linear or branched $C_2$–$C_8$alkylene, more preferably linear $C_2$–$C_6$alkylene and most preferably linear $C_2$–$C_4$alkylene. In a preferred embodiment of the invention, Z is 1,3-propylene or, especially, 1,2-ethylene.

Suitable substituents on the olefinic $C_2$–$C_{24}$ radical $R_8$ are, for example, $C_1$–$C_4$alkoxy, halogen, phenyl or carboxy.

$R_8$ is, for example, a radical of formula

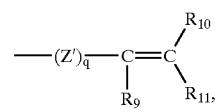

(5)

wherein q is the number 0 or 1, $R_9$ is hydrogen, $C_1$–$C_4$alkyl or halogen, each of $R_{10}$ and $R_{11}$ independently of the other is hydrogen, $C_1$–$C_4$alkyl, phenyl, carboxy or halogen, and Z' is linear or branched $C_1$–$C_{12}$alkylene or unsubstituted or $C_1$–$C_4$alkyl- or $C_1$–$C_4$alkoxy-substituted phenylene or $C_7$–$C_{12}$aralkylene.

When Z' is a phenylene radical, it is, for example, unsubstituted or methyl- or methoxy-substituted 1,2-, 1,3- or 1,4-phenylene. Preferably, Z' as a phenylene radical is 1,3- or 1,4-phenylene.

When Z' is an aralkylene radical, it is, for example, unsubstituted or methyl- or methoxy-substituted benzylene, wherein the methylene group is bonded to the amine nitrogen in each case. Preferably, Z' as an aralkylene radical is the 1,3- or 1,4-phenylenemethylene radical, wherein the methylene group is bonded to the amine nitrogen —NH— in each case.

Z' is preferably unsubstituted or methyl- or methoxy-substituted phenylene or phenylene-methylene or $C_1$–$C_{12}$alkylene, more preferably 1,3- or 1,4-phenylene or $C_1$–$C_6$alkylene, especially $C_1$–$C_2$alkylene and most preferably methylene.

q is the number 1 or, preferably, the number 0.

$R_9$ is preferably hydrogen, methyl or chlorine and most preferably hydrogen or methyl.

Each of $R_{10}$ and $R_{11}$ independently of the other is preferably hydrogen, carboxy, chlorine, methyl or phenyl. In a preferred embodiment of the invention, $R_{10}$ is hydrogen, chlorine, methyl or phenyl and $R_{11}$ is hydrogen or carboxy. Most preferably, $R_{10}$ and $R_{11}$ are each hydrogen.

Examples of suitable radicals $R_8$ are vinyl, 2-propenyl, allyl, 2-butenyl, o-, m- or p-vinylphenyl, styryl, 2-carboxyvinyl, 2-chloro-2-carboxyvinyl, 1,2-dichloro-2-carboxyvinyl, 1,2-dimethyl-2-carboxyvinyl and 2-methyl-2-carboxyvinyl.

Especially preferred radicals $R_8$ correspond to formula (5) wherein q is 0, $R_9$ is hydrogen or methyl, $R_{10}$ is hydrogen, methyl, chlorine or phenyl and $R_{11}$ is hydrogen or carboxy.

Other especially preferred radicals $R_8$ correspond to the above formula (5) wherein q is 1, Z' is 1,3- or 1,4-phenylene or $C_1$–$C_6$alkylene, especially $C_1$–$C_2$alkylene, $R_9$ is hydrogen or methyl and $R_{10}$ and $R_{11}$ are each hydrogen.

Z" is preferably $C_1$–$C_4$alkylene, especially methylene or 1,1-dimethylmethylene.

In formulae (4b) and (4c), the variable W is preferably a $C_2$–$C_6$alkylene radical or a 1,3- or 1,4-phenylene radical and most preferably a $C_2$–$C_3$alkylene radical. Each of $R_7$ and $R_7'$ independently of the other is preferably hydrogen, methyl or chlorine. Most preferably, each of $R_7$ and $R_7'$ independently of the other is hydrogen or methyl.

One group of suitable radicals Q corresponds to the above formula (3) wherein n is 0 and $Q_1$ is a radical of the above formula (4a) wherein m is 0 and for $R_8$ the meanings and preferences given above apply.

A second group of suitable radicals Q corresponds to the above formula (3) wherein n is 1 and $Q_1$ is a radical of the above formula. (4a) wherein m is 0 and for $R_8$ and Z the meanings and preferences given above apply.

A further group of suitable radicals Q corresponds to the above formula (3) wherein n is 1 and $Q_1$ is a radical of the above formula (4a) wherein m is 1 and for $R_8$ and Z the meanings and preferences given above apply.

A further group of suitable radicals Q corresponds to the above formula (3) wherein n is 0 and $Q_1$ is a radical of the above formula (4d) wherein for $R_8$ and Z" the meanings and preferences given above apply.

Especially preferred radicals $R_6$ correspond to formula

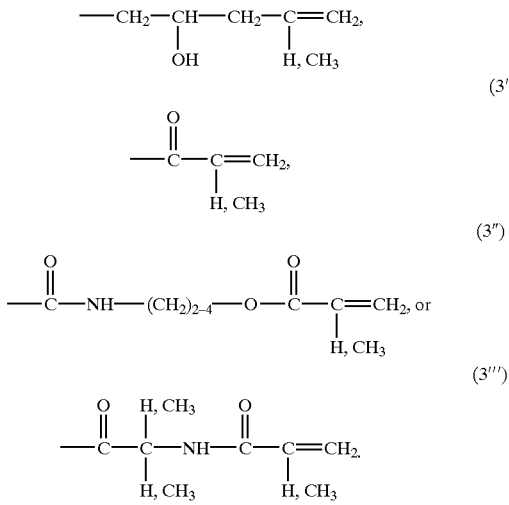

The polyallyl amines of the invention may contain, besides unreacted units of formula

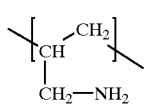

(1a)

or a suitable salt thereof such as a hydrochloride thereof, and units of the formula (1), one or more same or different units of formulae (2a)–(2e) above. The over-all percentage of units of formulae (2a)–(2e) can add up to, for example, 1 to 99%, preferably 1 to 75%, more preferably 1 to 50% and in particular to 5 to 20%, based in each case on the number of amino groups of the polyallyl amine.

The polyallyl amine polymers of the invention preferably comprise at least 1%, more preferably at least 10%, even more preferably at least 20%, particularly preferably at least 40% of units of formula (1a), based on the number of amino groups of the polyallyl amine.

One group of preferred polyallyl amine polymers according to the invention concerns those consisting essentially of units of formulae (1) and units of formula (1a), wherein the amount of the first ones is as given above including the preferences, and the percentage of the latter ones adds up to 100%, based on the number of amino groups of the polyallyl amine.

Another preferred embodiment of the invention concerns polyallyl amine polymers consisting essentially of
(a) units of formula (1),
(b) units of formula (2a), (2b), (2c) and/or (2d), and
(c) units of formula (1a).

Component (b) of the above polymers preferably comprises units of the formula (2a), (2b) or (2c) or a mixture of different units of formulae (2a), (2b) and/or (2c). Component (b) more preferably refers to one or two different units of formulae (2a) and/or (2b).

According to this embodiment of the invention, the amount of units of formula (1) [=component (a)] of the polymers is as given above including the preferences; the percentage of component (b) is from 1 to 99%, preferably 1 to 75%, more preferably 1 to 50% and in particular 5 to 20%, and the percentage of units of formula (1a) adds up to 100%, based in each case on the number of amino groups of the polyallyl amine.

Still another preferred embodiment of the invention concerns polyallyl amine polymers consisting essentially of
($a_1$) units of formula (1),
($b_1$) units of formula (2e),
($c_1$) units of formula (1a), and optionally
($d_1$) units of formula (2a), (2b), (2c) and/or (2d).

According to this embodiment of the invention, the amount of units of formula (1) [=component ($a_1$)] of the polymers is as given above including the preferences; the percentage of component ($b_1$) is, for example from 0.5 to 40%, preferably 1 to 30%, more preferably 2 to 25% and in particular 5 to 20%, the percentage of component ($d_1$) is, for example, from 0 to 50% and preferably 0 to 25%, and the percentage of units of formula (1a) adds up to 100%, based in each case on the number of amino groups of the polyallyl amine.

The polyallyl amine polymers of the invention have a weight average molecular weight of, for example, from 2000 to 1000000, preferably from 3000 to 500000, more preferably from 5000 to 150000 and in particular from 7500 to 100000.

The polymers of the invention may be prepared in a manner known per se. For example, a polyallyl amine having a weight average molecular weight of at least 2000 that comprises units of the above formula (1a), may be reacted with a lactone of formula

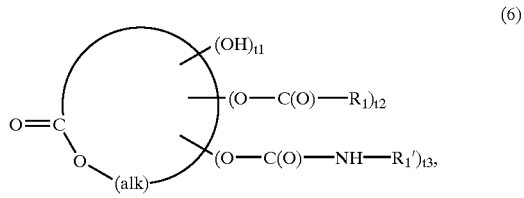

(6)

wherein (alk) is linear or branched $C_2$–$C_6$-alkylene, the sum of (t1+t2+t3) is at least 1, and $R_1$ and $R_1'$ are as defined above, to yield a polyallyl amine polymer comprising units of formula (1) and (1a).

The reaction between the polyallyl amine and the lactone may be performed in a manner known per se; for example, the polyallyl amine is reacted with the lactone in an aqueous medium at a temperature from about 0 to 100° C., preferably 15 to 60° C., more preferably 20 to 35° C., and in particular at room temperature. The ratio of units of formula (1) and (1a) in the final polymer is determined by the stoichiometry of the reactants. The lactones of formula (6) are known or may be prepared according to known methods. Compounds of formula (6) wherein t2 or t3 is ≧1 are for example available by reacting the respective hydroxy compound of formula (6) with a compound $R_1$—C(O)X or $R_1'$—NCO under conditions well-known in the art. Polyallyl amine starting materials of different molecular weights are commercially available e.g. in form of the hydrochloride. Said hydrochloride is converted previously into the free amine, for example, by a treatment with a base, for example with sodium or potassium hydroxide solution.

Polyallyl amines comprising additional modifier units may be prepared by adding to the reaction mixture of the polyallyl amine and the compound of formula (6) simultaneously or preferably successively one or more different compounds, for example, from the group of

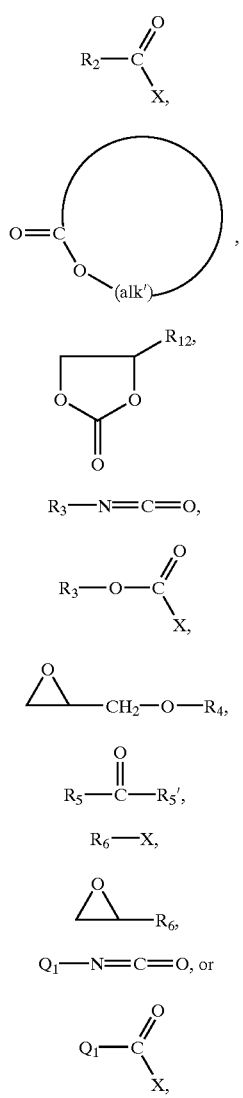

wherein X is halogen, preferably chlorine, (alk') is $C_1$-$C_{12}$-alkylene, $R_{12}$ is hydrogen or $C_1$-$C_2$-alkyl, preferably hydrogen or methyl, and $R_3$, $R_4$, $R_5$, $R_5'$, $R_6$ and $Q_1$ are as defined above. The reaction proceeds, for example, in an aqueous solution at room temperature or at elavated temperature of for example 25 to 60° C. and yields polymers comprising units of formula (2a) [with compounds of formulae (6a), (6b) or (6c)], units of formula (2b) [with compounds of formulae (6d), (6e)], units of formula (2c) [with compounds of formula (6f)], units of formula (2d) [with compounds of formula (6g)] or units of formula (2e)[ with compounds of formulae (6h), (6i), (6j) (6k)].

The reactions of the amino groups of the polyallyl amine with the different compounds of formulae (6) or (6a)–(6k) are well-known in the art and may be carried out as described in textbooks of organic chemistry; since the reactions proceed in general quantitatively, the structure of the modified polymers is determined mainly by the stoichiometry of the reactands that are employed into the reaction.

The polyallyl amine polymers obtained are isolated and purified according to methods known per se, for example extraction, precipitation, crystallisation, recrystallisation, dialysis, ultrafiltration or chromatographic purification methods. The compounds are obtained in high yields and a high degree of purity. In particular when using ultrafiltration the polymers according to the invention can be obtained in extremely pure form, for example in the form of concentrated aqueous solutions that are free or at least substantially free of reaction products, such as salts, and of starting materials or other non-polymeric constituents.

The preferred method of purifying the polymers according to the invention, ultrafiltration, may be carried out in a manner known per se. It is possible for the ultrafiltration to be carried out repeatedly, for example from two to ten times. The ultrafiltration may alternatively be carried out continuously until the desired degree of purity has been achieved. The desired degree of purity may, in principle, be as high as desired, and is preferably so selected that the content of undesired constituents in the polymer is, for example, ≦0.001%, especially ≦0.0001% (1 ppm). The polymers may in addition, for example as a result of their synthesis, comprise constituents that are acceptable from the physiological point of view, for example sodium chloride, such constituents advantageously being present in an amount of ≦1%, especially ≦0.1%, or more especially ≦0.01%.

The polyallyl amine polymers of the present invention are useful, for example, for the surface-modification of an organic or preferably organic substrates. The polymers of the invention thus advantageously may be used to improve certain properties, for example the bio-compatibility in the widest sense and more particular the hydrophilicity and wettability, of biomedical articles such as ophthalmic mouldings, for example, intraocular lenses, artificial cornea or particularly contact lenses. For example, the polymers of the invention may be used in the surface-modification processes as disclosed in PCT application WO 96/29796 or EP-A-0632329. The polymers of the invention further may be used for the formation of multi-layer coatings on biomedical articles, for example on ophthalmic lenses such as contact lenses, as disclosed in PCT application WO 99/35520. This coating technique involves attaching layers of one or more different cationic materials and layers of one or more different anionic materials one after the other on a given material surface in order to achieve a hydrophilic multi-layer coating thereon. The polyallyl amine polymers of the invention are preferably used in this process as a cationic layer imparting an improved hydrophilicity to the surface of the biomedical article.

Polymers according to the invention having modifier units of formula (2e) are crosslinkable or polymerizable and thus can be used, in addition to surface modification purposes, for the manufacture of mouldings such as biomedical mouldings, in particular ophthalmic mouldings such as contact lenses. Suitable polymers having units of the formula (2e) thus may be crosslinked or polymerized effectively and in a selective manner, especially by photo-crosslinking. The polymerization or crosslinking may be carried out in the presence or absence of an additional vinyl comonomer using customary free radical polymerization technics. Suitably, a photoinitiator such as benzoin methyl ether, 1-hydroxycyclohexylphenylketone, Darocure 1173 or an Irgacure type is added to a preferably aqueous solution of the polyallyl amine polymer which may comprise additional components such as a comonomer, and the solution is then crosslinked or polymerized in a mould using actinic radiation, in particular UV light. The crosslinked polymers are water-insoluble.

The photocrosslinking is preferably carried out directly from an approximately 15 to 90% aqueous solution of a polymerizable or crosslinkable polymer according to the invention, optionally after the addition of an additional vinyl comonomer.

Biomedical articles such as contact lenses obtainable from a polymer according to the invention have a wide range of advantageous properties, amongst which mention should be made, for example, of their excellent tolerability by the human cornea, which is based on a balance of water content, oxygen permeability and mechanical properties. The contact lenses according to the invention also exhibit a high degree of dimensional stability. No changes in shape can be detected even after autoclaving at, for example, approximately 120° C.

Attention may also be drawn to the fact that the contact lenses from a material according to the invention can be produced in a very simple and efficient manner compared with the state of the art. This is as a result of several factors. First, the starting materials can be obtained or produced at low cost. Secondly, there is the advantage that the polymers are surprisingly stable, so that they can be subjected to a high degree of purification. It is therefore possible to use for the crosslinking a polymer that requires virtually no subsequent purification, such as especially the complicated extraction of unpolymerised constituents.

All of the above advantages naturally apply not only to contact lenses but also to other mouldings according to the invention. The total effect of the various advantageous aspects in the production of the mouldings according to the invention is that the mouldings according to the invention are suitable especially as mass-produced articles, such as, for example, contact lenses that are worn for a short length of time and are then replaced by new lenses.

In the following Examples amounts are amounts by weight, unless specified otherwise, and temperatures are given in degrees Celsius. The Examples are not intended to limit the invention in any way, for example to the scope of the Examples.

EXAMPLE 1

Preparation of a polyallyl amine-δ-gluconolactone adduct 300 g of an aqueous polyallyl amine solution containing 0.682 mol equivalents of polyallyl amine are placed in a glass apparatus, and the apparatus is then flushed with nitrogen. Following the addition of 60.93 g (0.342 mol equivalents) of δ-gluconolactone at room temperature (25–27° C.), the reaction mixture is stirred for about 7 hours at a temperature from 25 to 35° C. The solution is then purified by means of filtration over a 0.45 μm filter and via ultrafiltration. After lyophilization 95.5 g of a powdered colorless polyallyl amine derivative comprising 50% of —NH—C(O)—[CH(OH)]$_4$—CH$_2$—OH units, based on the number of amino groups of the polyallyl amine is obtained.

EXAMPLE 2

The procedure of Example 1 is repeated using (a) 48.6 g (0.273 mol equivalents) and (b) 30.3 g (0.17 mol equivalents) each of δ-gluconolactone. Polyallyl amine derivatives comprising (a) 40% and (b) 25% of —NH—C(O)—[CH(OH)]$_4$—CH$_2$—OH units, based on the number of amino groups of the polyallyl amine are obtained.

EXAMPLE 3

Preparation of a polyallyl amine-δ-gluconolactone adduct Comprising Polymerizable Groups 300 g of an aqueous polyallyl amine solution containing 0.682 mol equivalents of polyallyl amine. are placed in a glass apparatus, and the apparatus is then flushed with nitrogen. Following the addition of 30.3 g (0.17 mol equivalents) of δ-gluconolactone at room temperature (25–27° C.), the reaction mixture is stirred for about 7 hours at a temperature from 25 to 350° C. To the resulting aqueous solution are added 15.9 g (0.1 mol equivalents) of 2-isocyanatoethyl methacrylate (IEM), and the reaction mixture is further stirred. After the reaction is complete the reaction mixture is worked up as described in Example 1. The product is a polyallyl amine derivative comprising 25% of —NH—C(O)—[CH(OH)]$_4$—CH$_2$—OH units and 15% of —NH—C(O)—NH—(CH$_2$)$_2$—O—C(O)—C(CH$_3$)=CH$_2$ units, based on the number of amino groups of the polyallyl amine.

EXAMPLE 4

Preparation of a polyallyl amine-δ-gluconolactone adduct Comprising a Further Non-reactive Modifier The procedure of Example 3 is repeated but using 48.6 g (0.273 mol equivalents) of δ-gluconolactone and 5.0 g (0.1 mol equivalents) of ethylene carbonate. A polyallyl amine derivative comprising 40% of —NH—C(O)—[CH(OH)]$_4$—CH$_2$—OH units and 15% of —NH—C(O)—(CH$_2$)$_2$—OH units, based on the number of amino groups of the polyallyl amine is obtained.

EXAMPLE 5

The procedure of Example 3 is repeated but using 5.9 g (0.07 mol equivalents) of γ-butyro-lactone instead of the IEM amount. A polyallyl amine derivative comprising 25% of —NH—C(O)—[CH(OH)]$_4$—CH$_2$—OH units and 10% of —NH—C(O)—(CH$_2$)$_3$—OH units, based on the number of amino groups of the polyallyl amine is obtained.

What is claimed is:

1. A polyallyl amine having a weight average molecular weight of at least 2000 that, based on the number of amino groups of the polyallyl amine, comprises from approximately 1 to 99% of units of formula

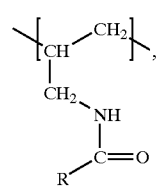

(1)

wherein R is C$_2$–C$_6$-alkyl which is substituted by two or more same or different substituents selected from the group consisting of hydroxy, C$_2$–C$_5$-alkanoyloxy and C$_2$–C$_5$-alkylaminocarbonyloxy.

2. A polymer according to claim 1, wherein R is $C_3$–$C_6$-alkyl which is substituted by two or more same or different substituents selected from the group consisting of a radical —OH, —O—C(O)—$R_1$ and —O—C(O)—NH—$R_1'$, wherein $R_1$ and $R_1'$ are each independently of the other $C_1$–$C_4$-alkyl.

3. A polymer according to claim 2, wherein R is a radical of formula

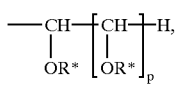
(2)

wherein p is 1, 2, 3, 4 or 5, each R* is independently hydrogen or a radical —C(O)—$R_1$ or —C(O)—NH—$R_1'$, and $R_1$ and $R_1'$ are as defined in claim 2.

4. A polymer according to claim 1, which comprises from 10 to 80% of units of formula (1), based on the number of amino groups of the polyallyl amine.

5. A polymer according to claim 1, which comprises, in addition to the units of formula (1), further modifier units selected-from the group consisting of

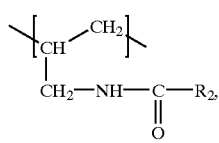
(2a)

wherein $R_2$ is $C_1$–$C_{12}$-alkyl which is unsubstituted or substituted by an amino, hydroxy or carboxy group;

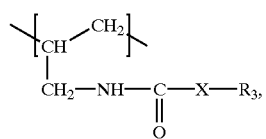
(2b)

wherein X is —O— or —NH— and $R_3$ is $C_1$–$C_{12}$-alkyl;

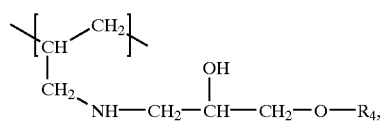
(2c)

wherein $R_4$ is hydrogen, $C_1$–$C_6$-alkyl which is unsubstituted or substituted by hydroxy, or is $C_5$–$C_7$-cycloalkyl or phenyl;

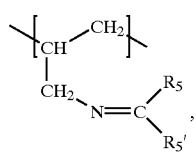
(2d)

wherein $R_5$ is $C_1$–$C_{12}$-alkyl and $R_5'$ is hydrogen or $C_1$–$C_{12}$-alkyl; and

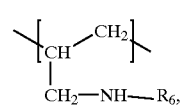
(2e)

wherein $R_6$ is a $C_3$–$C_{12}$-alkenyl radical which is unsubstituted or further substituted by hydroxy, or is a radical of formula

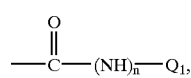
(3)

wherein $Q_1$ is a radical of formula

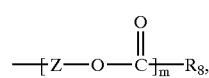
(4a)

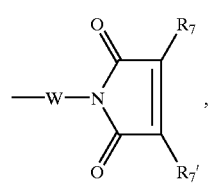
(4b)

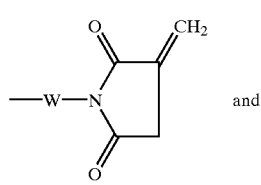
(4c)

and

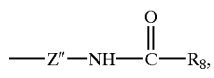
(4d)

and wherein
  Z is linear or branched $C_2$–$C_{12}$alkylene,
  $R_8$ is an olefinically unsaturated copolymerizable radical having from 2 to 24 carbon atoms which may be further substituted,
  W is a $C_2$–$C_{12}$alkylene radical, phenylene radical or $C_7$–$C_{12}$aralkylene radical,
  each of $R_7$ and $R_7'$ independently of the other is hydrogen, $C_1$–$C_4$alkyl or halogen,
  each of m and n independently of the other is the number 0 or 1, and
  Z" is $C_1$–$C_6$alkylene.

6. A polymer according to claim 1, consisting essentially of units of formula

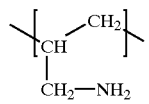
(1a)

or a salt thereof, and units of the formula (1).

7. A polymer according to claim 5, consisting essentially of
  (a) units of formula (1) according to claim 1,
  (b) units of formula (2a), (2b), (2c) and/or (2d) according to claim 5, and (c) units of formula

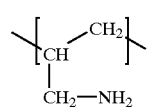
(1a)

or a salt thereof.

8. A polymer according to claim 5, consisting essentially of ($a_1$) units of formula (1) according to claim 1, ($b_1$) units of formula (2e) according to claim 5, ($c_1$) units of formula

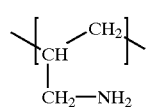
(1a)

or a salt thereof, and optionally ($d_1$) units of formula (2a), (2b), (2c) and/or (2d) according to claim 5.

9. A polymer according to claim 3, wherein p is 4.

10. A polymer according to claim 1, which comprises from 40 to 60% of units of formula (1), based on the number of amino groups of the polyallyl amine.

\* \* \* \* \*